US009656451B2

(12) United States Patent
Carretta (10) Patent No.: US 9,656,451 B2
(45) Date of Patent: May 23, 2017

(54) METHOD AND APPARATUS FOR MAKING DOUBLE PANELS (71) Applicant: FRIUL INTAGLI INDUSTRIES SPA, Prata di Pordenone (IT)

(72) Inventor: Flavio Carretta, Mansuè (IT)

(73) Assignee: FRIUL INTAGLI INDUSTRIES SPA, Prata di Pordenone (IT)

( * ) Notice: Subject to any disclaimer, the term of this patent is extended or adjusted under 35 U.S.C. 154(b) by 0 days.

(21) Appl. No.: 14/432,064

(22) PCT Filed: Sep. 26, 2013

(86) PCT No.: PCT/IB2013/002136
§ 371 (c)(1),
(2) Date: Mar. 27, 2015

(87) PCT Pub. No.: WO2014/049424
PCT Pub. Date: Apr. 3, 2014

(65) Prior Publication Data
US 2015/0273810 A1 Oct. 1, 2015

(30) Foreign Application Priority Data
Sep. 28, 2012 (IT) .............................. UD2012A0165

(51) Int. Cl.
B32B 37/00 (2006.01)
B32B 37/12 (2006.01)
(Continued)

(52) U.S. Cl.
CPC ...... *B32B 37/1292* (2013.01); *B32B 37/0046* (2013.01); *B32B 37/10* (2013.01);
(Continued)

(58) Field of Classification Search
CPC ... B32B 37/1292; B32B 37/146; B32B 37/18; B32B 2479/00; B32B 2607/00;
(Continued)

(56) References Cited

U.S. PATENT DOCUMENTS 2,236,527 A * 4/1941 Drew ....................... C09J 7/048
428/352
3,899,860 A * 8/1975 Newell .................... B27D 1/04
156/182

(Continued)

FOREIGN PATENT DOCUMENTS

DE 2423845 12/1974
WO WO 2005/077654 8/2005

*Primary Examiner* — John Goff
(74) *Attorney, Agent, or Firm* — Hamre, Schumann, Mueller & Larson, P.C.

(57) ABSTRACT

A method to make a double panel (12) comprises:
the automated or semi-automated production of a first semi-worked piece (31) formed by a first cover (14) on which one or more honeycomb inserts (16) are glued using at least a first glue (19),
the automated or semi-automated production of a second semi-worked piece (32) formed by a second cover (15) on which strengthening strips (18) are glued using one or more second glues (20),
the automated or semi-automated composition and pressing of the first semi-worked piece (31) and of the second semi-worked piece (32) in order to obtain the double panel (12).

11 Claims, 3 Drawing Sheets (51) Int. Cl.
  *B32B 37/14* (2006.01)
  *E04C 2/36* (2006.01)
  *B32B 37/10* (2006.01)
  *B32B 37/18* (2006.01)

(52) U.S. Cl.
  CPC ........ *B32B 37/1284* (2013.01); *B32B 37/146* (2013.01); *B32B 37/18* (2013.01); *E04C 2/365* (2013.01); *B32B 2479/00* (2013.01); *B32B 2607/00* (2013.01)

(58) Field of Classification Search
  CPC ... B29C 66/725; B29C 66/7254; E04C 2/365; E06B 3/822; E06B 3/825; E06B 2003/7063
  USPC ............ 52/793.11, 793.1; 156/182, 556, 557
  See application file for complete search history.

(56) References Cited

U.S. PATENT DOCUMENTS

| | | | |
|---|---|---|---|
| 5,782,055 A * | 7/1998 | Crittenden | E06B 3/7001 52/316 |
| 2005/0028921 A1 | 2/2005 | Stroup et al. | |
| 2012/0027999 A1* | 2/2012 | Liang | B27M 1/08 428/172 |

* cited by examiner fig. 1 fig. 2 fig. 3 fig. 4

METHOD AND APPARATUS FOR MAKING DOUBLE PANELS

FIELD OF THE INVENTION

The present invention concerns a method and an apparatus for making rough double panels, suitable—once they have been properly trimmed, shaped and sized—for the production of furniture or furnishing elements, and for door and window frames, to replace MDF (Medium Density Fiberboard) panels or chipboard.

BACKGROUND OF THE INVENTION

It is known that, to replace MDF or chipboard panels it is possible to use double panels to make furniture or furnishing elements, such as doors, support or work planes, sides, fronts or backs, or shelves, and also to make door and window frames.

Rough double panels comprise a sandwich structure formed by a multiplicity of layers that include two sheets, also called covers in technical jargon, generally made of HDF (High Density Fiberboard) material, opposite on one side and the other, between which one or more honeycomb inserts are contained, generally made of paper, impregnated paper, cardboard, stiff cardboard or suchlike, or aluminum, and finally strengthening strips, for example made of chipboard, generally disposed longitudinally at the side of the honeycomb inserts, although there are solutions with additional strengthening strips, disposed transverse between the various honeycomb inserts. Normally, these strips must confer both structure and mechanical stability, so that the panels can be subjected to subsequent workings such as coating, squaring and edging, and also allow to assemble the furniture or furnishing elements using common attachment systems.

It is known to make said double panels manually, where a specialized operator subsequently composes and glues the various components that make up the sandwich structure.

Automated or semi-automated techniques are also known, which allow to make said double panels more quickly.

However, since these techniques are automated or semi-automated, they can have constraints in the use of the materials, in particular of the glues used.

In particular, one known completely automated technique that is commonly used provides to simultaneously feed the components of the sandwich structure, already disposed in the correct reciprocal positions, toward a pressing unit with rollers, which makes them solid in their final form, after depositing a glue between the different layers.

This known solution in particular provides to dose the glue only on the two covers, with a roller application or with other dosing and spreading systems that apply the glue on the whole surface thereof. However, as this solution provides to dose the glue only once on the two covers before the various components enter the pressing unit with rollers, or press, it does not leave any possibility, as mentioned above, of selecting different types of glue to connect the different components, nor different types of dosing and application of the glue, other than the technique of distributing the glue homogeneously using the rollers or other application systems on the whole surface of the covers or the honeycomb and strips simultaneously. Furthermore, this technique entails a large consumption of glue to be applied on the whole surface of the covers.

Document WO-A-2005/077654 describes a known method and device to make a sandwich panel automatically, which comprises honeycomb inserts.

Document US-A-2005/028921 describes a method and apparatus to produce composite doors automatically.

Document DE-A-2423845 describes a method and device to produce panels lined with a sheet of decorative material.

In these known documents, the last working step is always to glue the second cover sheet to the semi-worked piece consisting of the first cover sheet, the strengthening strips and the honeycomb insert, with all the disadvantages as described above.

One purpose of the present invention is therefore to perfect a method and to obtain an apparatus that allow, on the one hand, to produce the rough double panels in an automated manner and, on the other, allow greater freedom in managing the glues, both in terms of type of glue and also in the techniques for dosing and applying said glues.

Another purpose of the present invention is to perfect a method and to obtain an apparatus to produce rough double panels that has good productivity, reducing the waiting times needed to make the panel.

SUMMARY OF THE INVENTION

The present invention is set forth and characterized in the independent claims, while the dependent claims describe other characteristics of the invention or variants to the main inventive idea.

In accordance with the above purposes, a method to make a double panel that overcomes the limits of the state of the art, and eliminates the defects present therein, comprises:
- the automated or semi-automated production of a first semi-worked piece formed by a first cover on which one or more honeycomb inserts are glued using at least a first glue,
- the automated or semi-automated production of a second semi-worked piece formed by a second cover on which strengthening strips are glued using one or more second glues,
- the automated or semi-automated composition and pressing of the first semi-worked piece and of the second semi-worked piece in order to obtain the double panel.

In a variant of the present invention, the first semi-worked piece is made in parallel at least at the same time as the second semi-worked piece is made, or, in other variants, is made at different times.

In a variant of the present invention, the at least one first glue is different from the one or more second glues.

In another variant of the present invention, the at least one first glue is the same as the one or more second glues.

In a variant of the present invention, the type and method for applying the at least one first glue is different from that of the one or more second glues.

In another variant of the present invention, the type and method for applying the at least one first glue is the same as that of the one or more second glues.

In a variant of the present invention, the one or more second glues are dosed in strips or bands of glue associated to the strengthening strips. In other variants, the one or more second glues are distributed by spreading. In variant executions, the spreading can be done by rollers, or blades or spatulas.

In some forms of embodiment, the method provides to dose a plurality of second glues of different types, to perform different functions.

In some forms of embodiment, which can be combined with all the forms of embodiment described here, the method provides to dose a plurality of second glues of different thicknesses.

In a variant of the present invention, the at least one first glue is dosed and applied on the one or more honeycomb inserts by spreading. In a variant, the spreading is done by rollers. In another variant, the spreading is done by blades or spatulas.

The present invention also concerns an apparatus to produce a double panel that comprises:
- a first station configured for the automated or semi-automated production of a first semi-worked piece formed by a first cover on which one or more honeycomb inserts are glued;
- a second station configured for the automated or semi-automated production of a second semi-worked piece formed by a second cover on which strengthening strips are glued;
- a third station configured for the automated or semi-automated composition of the first semi-worked piece and the second semi-worked piece in order to obtain the double panel.

BRIEF DESCRIPTION OF THE DRAWINGS

These and other characteristics of the present invention will become apparent from the following description of some forms of embodiment, given as a non-restrictive example with reference to the attached drawings wherein.

To facilitate comprehension, the same reference numbers have been used, where possible, to identify identical common elements in the drawings.

DETAILED DESCRIPTION OF SOME FORMS OF EMBODIMENT

We shall now refer in detail to the various forms of embodiment of the invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

Figure 1:
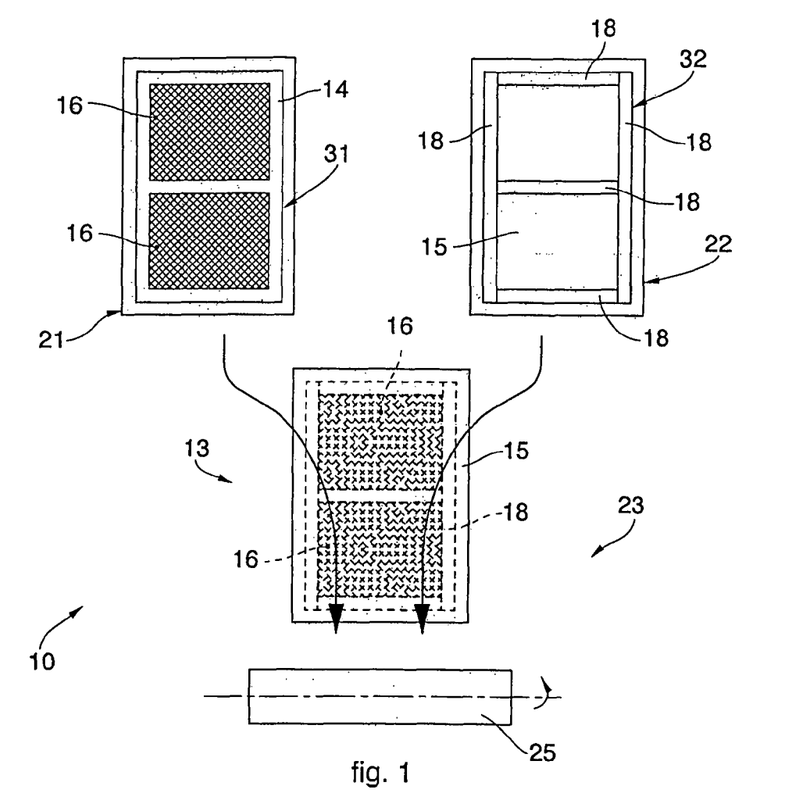
FIG. 1 is a schematic plan view from above of an apparatus for executing the method according to the present invention.
Figure 2:
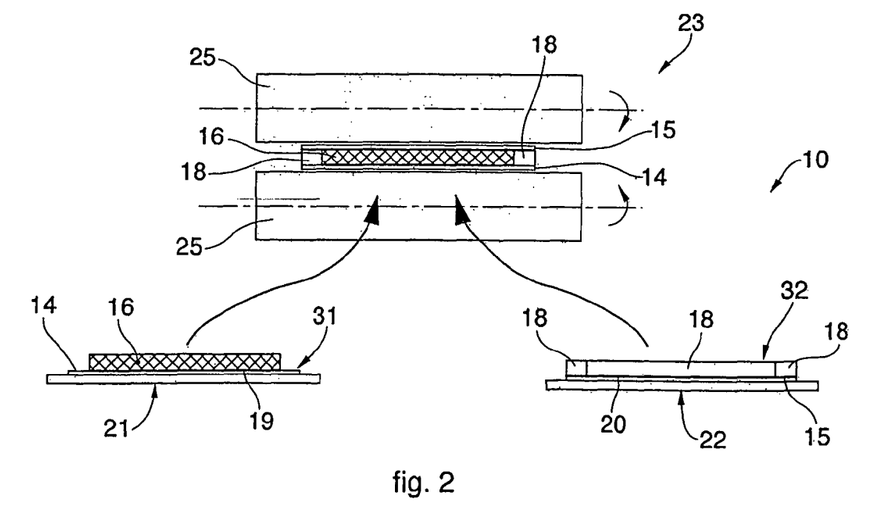
FIG. 2 is a lateral schematic view of FIG. 1.
Figure 3:
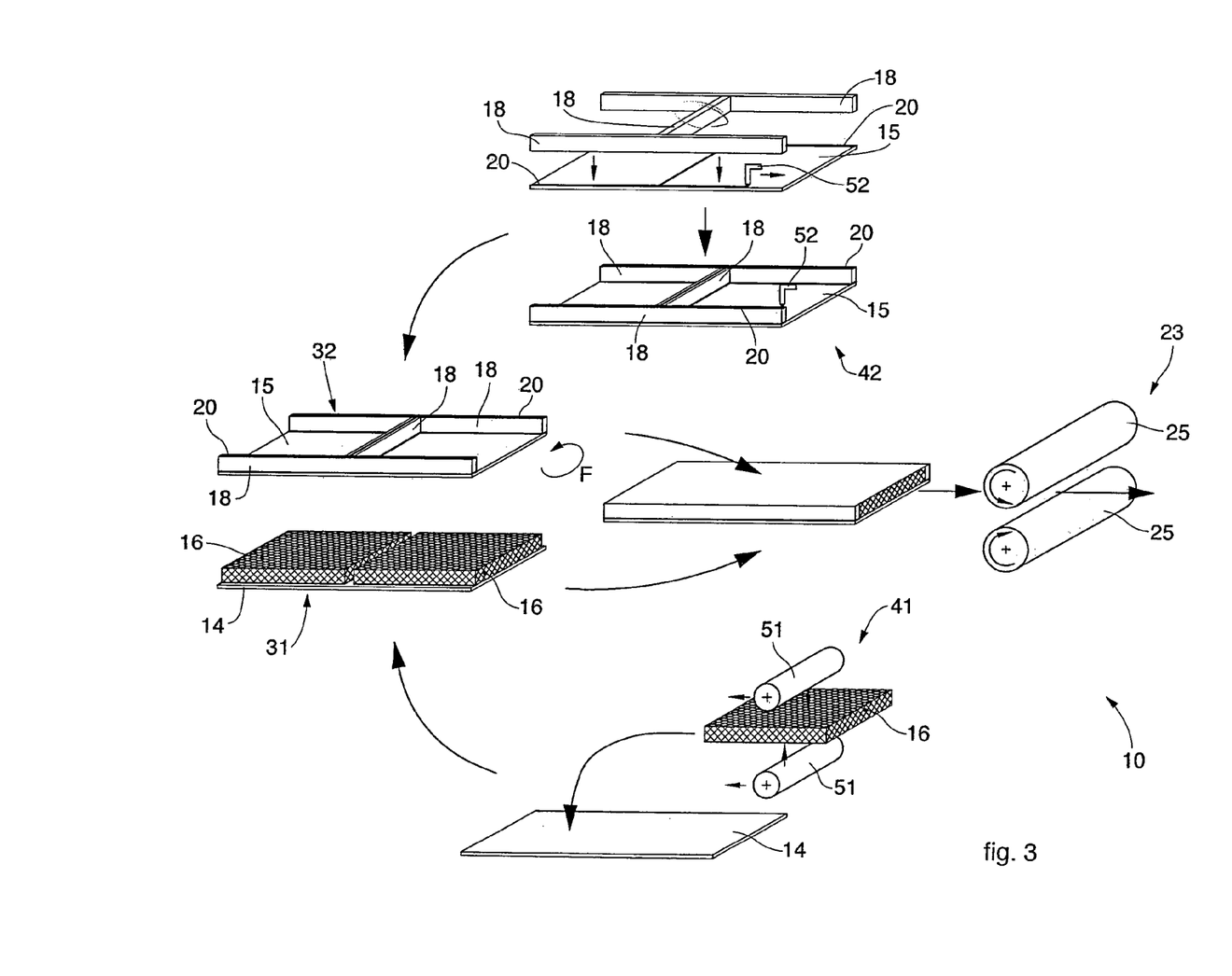
FIG. 3 is a three-dimensional schematic view of FIG. 1.

With reference to FIGS. 1, 2 and 3, an apparatus 10 according to the present invention is used to execute a method for making rough double panels 12.

Figure 4:
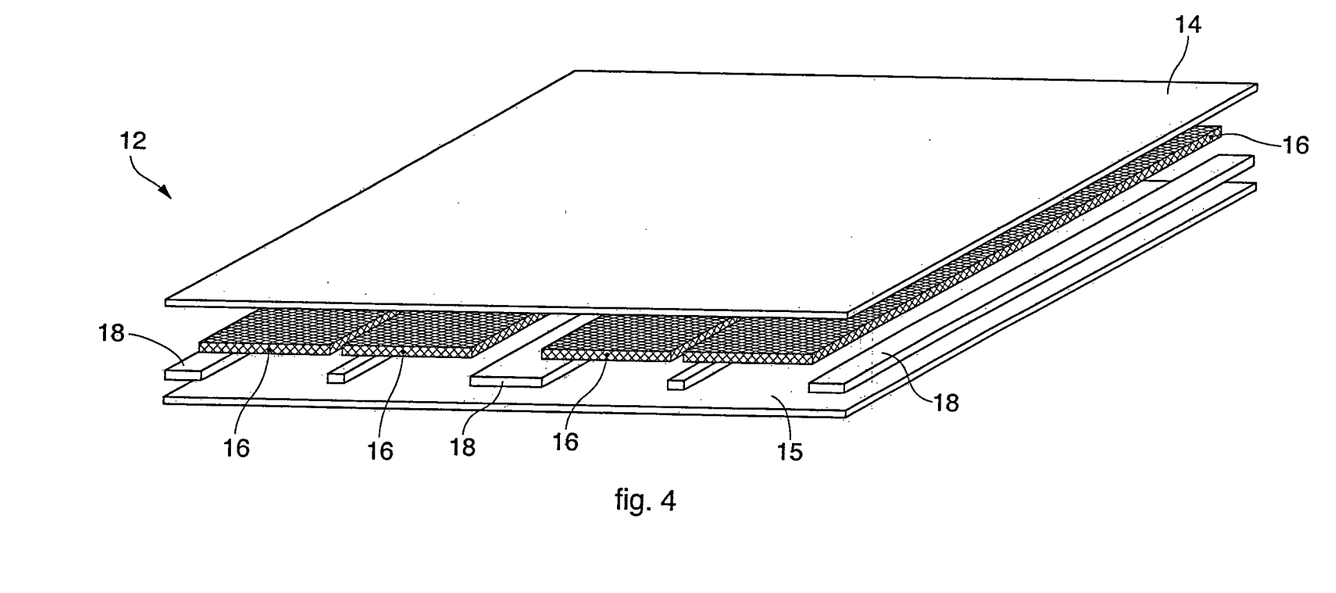
FIG. 4 is a schematic view in separate parts of a rough double panel.

One example of forms of embodiment of a double panel 12 that can be made according to the present invention, which can be combined with all the forms of embodiment described here, is described using FIG. 4.

The double panel 12 can be formed, by way of example, by a sandwich structure 13. The sandwich structure 13 can include layers that include two external sheets or covers 14, 15, for example made of HDF (High Density Fiberboard), between which one or more honeycomb inserts 16 are contained, for example made of paper, impregnated paper, cardboard, stiff cardboard, metal materials, preferably light metals, for example aluminum or suchlike, and strengthening strips 18, for example chipboard, which can be disposed according to needs, both along the longitudinal edges, at the sides of the honeycomb inserts 16, and also possibly in an intermediate or transverse position between the honeycomb inserts 16.

A non-restrictive example of the size of the double panel 12 can provide an overall length of up to 5000 mm.

A non-restrictive example of the size of the double panel 12 can provide a width of from 300 mm to 1500 mm, with examples of standard mean measurements with a width of 1200 mm.

For example, each cover 14, 15 can have a thickness of between 1.5 mm and 8 mm (for example 2.5 mm).

For example, the covers 14, 15 can have a rectangular shape, that is sized and shaped mating with the shape of the final double panel 12.

For example, each of the strengthening strips 18 can have a thickness of between 10 mm and 60 mm, for example 18 mm.

In some forms of embodiment, which can be combined with all the forms of embodiment described here, the apparatus 10 according to the present invention can comprise a first station 21 configured for the automated or semi-automated production of a first semi-worked piece 31 formed by a first cover 14, in this case identified as lower, on which the one or more honeycomb inserts 16 required are glued.

In some forms of embodiment, which can be combined with all the forms of embodiment described here, the apparatus 10 according to the present invention can also comprise a second station 22 configured for the automated or semi-automated production of a second semi-worked piece 32 formed by a second cover 15, in this case identified as upper, on which the required strengthening strips 18 are glued.

In variant forms of embodiment, the first station 21 and the second station 22 are configured to operate in parallel, at least in temporal terms, possibly also in terms of position, that is, they can be aligned in corresponding parallel work directions.

In some forms of embodiment, which can be combined with all the forms of embodiment described here, the apparatus 10 can also comprise a third station 23 for composing the sandwich structure 13 of the double panel 12, disposed in series downstream of the first station 21 and the second station 22.

In some forms of embodiment, which can be combined with all the forms of embodiment described here, the third station 23 includes a pressing unit with rollers 25, such as a calender unit 25. The third station 23 can be configured to receive the first semi-worked piece 31 and the second semi-worked piece 32 that are coupled to each other by reciprocal gluing and subsequently fed to the pressing unit with rollers 25 which makes the sandwich structure 13 solid. In particular, in some forms of embodiment, the second semi-worked piece 31 may be upended on the second semi-worked piece 32, or vice versa, for example by rotation in the direction shown by arrow F in FIG. 3, using suitable upending devices such as levers, rotating bars, pivoting supports or similar devices.

Some forms of embodiment of the present invention, which can be combined with all the forms of embodiment described here, can provide to use automatic, pneumatic, mechanical, electromechanical, electronic or robotized manipulators or positioning devices, or combinations of two or more of these, to move and associate, in the two stations 21, 22, the individual components of the semi-worked pieces 31, 32 with respect to each other, that is, respectively the first cover 14 with the one or more honeycomb inserts 16 and the second cover 15 with the strengthening strips 18. Moreover, in some forms of embodiment, analogous manipulators or automatic positioning devices can be provided in the third station 23 to move and associate the two semi-worked pieces 31, 32 with respect to each other.

In some forms of embodiment, which can be combined with all the forms of embodiment described here, the first station 21 can include a first dosing unit 41 (FIG. 3) for dosing a first glue 19. The first dosing unit 41 can include automated members for moving elements to deliver the glue.

In some variant forms of embodiment, which can be combined with all the forms of embodiment described here, the first glue 19 can be a glue with a rapid, normal or slow polymerization.

In some forms of embodiment, which can be combined with all the forms of embodiment described here, the first dosing unit 41 can be configured and used to apply the first glue 19 on two opposite faces of the one or more honeycomb inserts 16 intended to be glued on the first cover 14 and the second cover 15. This operation can be carried out for example simultaneously on the two faces of the one or more honeycomb inserts 16, or first on a lower face that will be disposed on the first cover 14 and subsequently on an upper face onto which, in turn, the second cover 15 of the second semi-worked piece 32 will be glued.

In variant forms of embodiment, which can be combined with all the forms of embodiment described here, the first dosing unit 41 can include one or more rollers 51 able to spread the first glue 19. In other variants, the first dosing unit 41 can include one or more nozzles able to deliver a strip, bead or line of the first glue 19. In yet other variants, the first dosing unit 41 can include members for spraying the first glue 19.

In some forms of embodiment, which can be combined with all the forms of embodiment described here, the second station 22 can include a second dosing unit 42 for dosing at least a second glue 20, that is, one or more second glues. For example, it may be provided to dose only one type of second glue 20, or a multiplicity, for example two, three or even more than three different types of second glues 20. In some forms of embodiment, which can be combined with all the forms of embodiment described here, the second dosing unit 42 can include automated members for moving elements to deliver the glue.

In some variant forms of embodiment, which can be combined with all the forms of embodiment described here, the second glue 20 can be a rapid polymerization glue.

In some variant forms of embodiment, the second glue 20 can be different from the first glue 19.

In other variant forms of embodiment, the second glue 20 can be the same as the first glue 19.

In some variants of the invention, whether the glues (meaning the first and second glues, and also the possible types of the second glue) are the same or different, the manner of application can in any case be varied according to needs, and the physical parameters connected to the polymerization of the glues can also possibly vary.

In accordance with the present description, the choice of the at least one first glue 19 and the one or more second glues 20 can be dictated by the need to obtain, all in all, an enduring adhesion, an advantageous cost and the same gluing capacity above and below the panel, particularly with regard to gluing the one or more honeycomb inserts 16.

In variant forms of embodiment, the second dosing unit 42 can be configured and used to apply the second glue 20 on the second cover 15 and on the free upper face, that is, the one not glued, of the strengthening strips 18. This operation can be carried out simultaneously on the second cover 15 and on the upper face of the strengthening strips 18, or first on the second cover 15 and subsequently on the upper face on which, in turn, the first cover 14 of the first semi-worked piece 31 will be glued.

In variant forms of embodiment, the second dosing unit 42 can be used to apply the second glue 20 on two opposite faces of the strengthening strips 18 intended to be glued on the first cover 14 and the second cover 15. This operation can be carried out simultaneously on the two faces of the one or more strengthening strips 18, or first on a lower face that will be disposed on the second cover 15 and subsequently on an upper face onto which, in turn, the first cover 14 of the first semi-worked piece 31 will be glued.

In variant forms of embodiment, which can be combined with all the forms of embodiment described here, the second dosing unit 42 can include one or more nozzles 52 configured to deliver one or more strips, bands, beads or lines of the second glue 20.

In some forms of embodiment, which can be combined with all the forms of embodiment described here, it may be provided to dose a plurality of second glues 20. These second glues 20 can be different from each other and/or for example perform different functions from each other. For example, in possible implementations, it may be provided to dose a type of second glue 20 that can guarantee an immediate adhesion, and also at least another type of second glue 20 that can guarantee an enduring adhesion, that is, one that develops over time. In this way, it is possible to use one or more second glues 20 which have a limited cost and different adhesion capacities, for example with an adhesion that develops over time, compared with one or more other types of second glue 20, with an higher cost and different adhesion capacity, for example with a greater immediate adhesion, obtaining overall the same adhesion and type of gluing both above and below the panel.

For example, one possible type of glue with reduced cost and an adhesion that develops over time can be a vinyl glue.

Furthermore, for example, one possible type of glue with higher cost and a more rapid adhesion, substantially immediate, can be a polyurethane glue.

In possible implementations, therefore, the second dosing unit 42 can be configured to dose a multiplicity of second glues 20. For example, the second dosing unit 42 may include one or more nozzles 52 able to deliver several strips, bands, beads or lines of a plurality of second glues 20.

In possible implementations, the different types of second glue 20 can also be dosed with different thicknesses.

For example, according to some forms of embodiment of the present description, it is possible to dose strips, bands, beads or lines of different types of second glue that alternate in a desired sequence, for example in groups of strips of one type of second glue alternated with groups of strips of other types of second glue.

In some forms of embodiment, which can be combined with all the forms of embodiment described here, the method according to the present invention can comprise a step of making the first semi-worked piece 31, carried out at the first station 21, which provides to dose and apply the at least one first glue 19 on the one or more honeycomb inserts 16 that will be included in the sandwich structure 13 of the double panel 12.

In the production step of the first semi-worked piece 31, the one or more honeycomb inserts 16 are deposited and glued on the first cover 14, according to a predefined positioning pattern of the one or more honeycomb inserts 16 (FIGS. 1, 2 and 3).

The first glue 19 can be dosed and applied first on a lower face of the one or more honeycomb inserts 16, in this case by means of the first dosing unit 41, and then the deposition and gluing of the one or more honeycomb inserts 16 on the first cover 14 is finalized, and subsequently the first glue 19 is also dosed and applied on the upper face of the one or more honeycomb inserts 16, in this case by means of the first dosing unit 41.

Or, according to a variant, the first glue 19 can be dosed and applied simultaneously both on the lower face and on the upper face of the one or more honeycomb inserts 16, in this case by means of the first dosing unit 41.

The method according to the present invention comprises a step of making the second semi-worked piece 32, carried out at the second station 22, which provides to dose and apply the one or more second glues 20 on the one or more strengthening strips 18 which will be included in the sandwich structure 13 of the double panel 12 (FIGS. 1, 2 and 3).

The step of making the second semi-worked piece 32 can be carried out simultaneously, or in parallel operating times, with the step of making the first semi-worked piece 31, or it can be carried out at different times, either before or after, the step of making the first semi-worked piece 31.

In the step of making the second semi-worked piece 32, strengthening strips 18 are deposited and glued on the second cover 15, according to a predefined positioning pattern of the strengthening strips 18.

For example, one basic positioning pattern may provide only two strengthening strips 18 disposed parallel along two opposite longitudinal edges of the second cover 15, so that, in the double panel 12, they are at the sides of the one or more honeycomb inserts 16.

Another positioning pattern can provide, as well as the two strengthening strips 18 disposed peripheral along the two longitudinal edges, other strengthening strips 18, disposed intermediate and parallel to the two peripheral strengthening strips 18.

Another positioning pattern can also provide further transverse strengthening strips 18, both peripheral, to define a peripheral closing frame with said two strengthening strips 18, and also intermediate.

In any case, we maintain that it is preferable that the positioning pattern of the strengthening strips 18 mates with and is possibly complementary to the positioning pattern of the one or more honeycomb inserts 16. We maintain that the correct reciprocal positioning and precise alignment of the strengthening strips 18 on the second cover 15 and the one or more honeycomb inserts 16 on the first cover 14 allows and facilitates the subsequent composition of the first semi-worked piece 31 and the second semi-worked piece 32 to obtain the double panel 12.

The second glue 20 can be dosed and applied, in this case by means of the second dosing unit 42, first on the second cover 15, achieving adhesive tracks in coordination with the shape of the strengthening strips 18, for example along the longitudinal edges on which strengthening strips 18 are glued, and then, once the strengthening strips 18 have been positioned, on the upper face of the latter.

Otherwise, the second glue 20 can be dosed and applied first on a lower face of the strengthening strips 18, in this case by means of the second dosing unit 42, and then the deposition and gluing of the strengthening strips 18 on the second cover 15 is finalized, and subsequently the second glue 20 is also dosed and applied on the upper face of the strengthening strips 18, in this case by means of the second dosing unit 42.

Or, according to another variant, the second glue 20 can be dosed and applied simultaneously both on the second cover 15 or on the lower face of the strengthening strips 18, and also on the upper face of the strengthening strips 18, in this case by means of the second dosing unit 42.

In some forms of embodiment, which can be combined with all the forms of embodiment described here, the method according to the present invention can comprise a step of composing the first semi-worked piece 31 and the second semi-worked piece 32, which are coupled and made solid with each other, in correspondence with the third station 23. In particular, in some forms of embodiment, the second semi-worked piece 32 is upended and positioned on the first semi-worked piece 31, so that the first glue 19 present on the upper face of the one or more honeycomb inserts 16 cooperates with the surface of the second cover 15, and the second glue 20 present on the upper face of the strengthening strips 18 cooperates with the surface of the first cover 14.

The first semi-worked piece 31 and the second semi-worked piece 32, once composed, are then subjected to a pressing operation, in this case by means of the pressing unit with rollers 25, to confer the necessary stability and strength on the sandwich structure 13 of the double panel 12.

In some forms of embodiment, which can be combined with all the forms of embodiment described here, the method according to the present invention can include:
i) feeding the first cover 14;
ii) applying the at least one first glue 19 on the lower face of the one or more honeycomb inserts 16;
iii) attaching the one or more honeycomb inserts 16 on the first cover 14 to obtain the first semi-worked piece 31;
iv) possibly cutting to size the one or more honeycomb inserts 16;
v) applying the one or more second glues 20 on the second cover 15;
vi) sectioning a chipboard panel, calibrating and cutting it to make the strengthening strips 18 and depositing them on the second cover 15;
vii) attaching the strengthening strips 18 on the second cover 15 to obtain the second semi-worked piece 32;
viii) applying the at least one first glue 19 on the upper face of the one or more honeycomb inserts 16;
ix) applying the one or more second glues 20 on the upper face of the strengthening strips 18;
x) upending the second semi-worked piece 32 on the first semi-worked piece 31;
xi) composing the sandwich structure 13 formed by the first semi-worked piece 31 and the second semi-worked piece 32;
xii) calendering the sandwich structure 13 to obtain the double panel 12;
xiii) trimming and discharge of the double panel 12.

We maintain that, by dividing the composition of the double panel 12 into two sub-steps that produce two semi-worked pieces 31, 32, performed in parallel or in sequence, the present invention generally allows to manage the glue in a differentiated manner, allowing to adopt different strategies, suitably personalized for the different production problems and needs of the two semi-worked pieces 31, 32.

In particular, the present invention allows to select both the type of glue and also the manner it is dosed and applied, in an optimum manner for the different functions that the glues must perform, in particular for attaching the one or more honeycomb inserts 16 to the covers 14, 15 and the strengthening strips 18 to the covers 14, 15.

Variant forms of embodiment can provide to select one and/or another of the glues used, meaning the at least one first glue 19 and the one or more second glues 20, from a group comprising thermosetting glues, such as for example vinyl glue, or hot-melt glues, such as for example polyurethane glues, or thermoplastic glues.

We maintain that, by applying and dosing the glue no longer only on the whole surface of the two covers as in the state of the art, but only on the one or more honeycomb inserts 16, to obtain the first semi-worked piece 31, and only on the upper and lower faces of the strengthening strips 18, or alternatively only on an upper face of the strengthening strips 18 and only along adhesive tracks deposited on the second cover 15, mating in shape with the strengthening strips 18, the present invention allows a considerable economic saving, connected to the reduction in consumption of glue and the reduction in the overall gluing times, including a reduction in the times required for depositing the glue and an optimization of the polymerization times needed to confer mechanical stability on the double panel 12.

We also maintain that, in some forms of embodiment, the application of the one or more second glues 20 in the form of one or more strips, bands, beads or lines of glue on the strengthening strips 18 can reduce the weight in grams of the double panel 12, and can allow to save glue compared with known techniques which provide to spread the glue using rollers over the whole surface of the covers.

We also maintain that, in possible forms of embodiment, using a rapid polymerization glue as a second glue 20 allows to rapidly make the structure of the double panel 12 solid and stable, which can thus be handled to be discharged from the work area and possibly sent for subsequent working such as finishing and enhancement, or put in store, without having to wait long times for the glue to set, which would prevent the rapid movement of the double panel 12, and hence productivity is improved.

Apart from the possibility of differentiating the method of application and the type of glue, it is also possible, with the present invention, to apply different process parameters, such as temperature, to the dosage of the glues concerned. In this way, for example, it will be possible to differentiate the temperature of polymerization of the glues used, without influencing the properties of the semi-worked pieces 31, 32 or the overall productivity or economic cost of the double panel 12. For example, glues that polymerize at high temperature normally cost less than those that polymerize at a lower temperature. By selectively using glues according to needs, therefore, it will be possible to expose to the different temperatures only the specific components involved, and not all the components as a whole, or the complete double panel 12.

Furthermore, in the perspective of using a rapid polymerization glue, generally more expensive, we maintain that the deposition of the one or more second glues 20 in the form of one or more strips, bands, beads or lines of glue on the strengthening strips 18, by reducing the absolute quantity of this type of glue in the double panel 12, allows a considerable saving and yet still guarantees a double panel 12 which, substantially immediately, has stable structural properties that allow it to be moved.

It is clear, however, that modifications and/or additions of steps and/or parts may be made to the method and apparatus for making a double panel as described heretofore, without departing from the field and scope of the present invention.

It is also clear that, although the present invention has been described with reference to a specific example, a person of skill in the art shall certainly be able to achieve many other equivalent forms of method and apparatus for making a double panel, having the characteristics as set forth in the claims and hence all coming within the field of protection defined thereby.

The invention claimed is:

1. A method to make a double panel, wherein the method comprises:
    automated or semi-automated production of a first semi-worked piece formed by a first cover on which one or more honeycomb inserts are glued using at least a first glue,
    automated or semi-automated production of a second semi-worked piece formed by a second cover on which strengthening strips are glued using one or more second glues,
    automated or semi-automated composition and pressing of the first semi-worked piece and of the second semi-worked piece in order to obtain the double panel,
    wherein a dosage and application of the one or more second glues are carried out alternatively:
    on the second cover, making adhesive tracks in coordination with the shape of the strengthening strips, and then, once the strengthening strips are positioned on the second cover, carrying out the dosage and application of the one or more second glues on a free upper face of the strengthening strips;
    or firstly on a lower face of the strengthening strips, subsequently depositing and gluing the strengthening strips on the second cover and then dosing and applying the one or more second glues also on an upper face of the strengthening strips;
    or at the same time both on the second cover, or on the lower face of the strengthening strips, and on the upper face of the strengthening strips.

2. The method as in claim 1, wherein the first semi-worked piece is made in parallel at least at the same time as the second semi-worked piece is made, or is made at different times.

3. The method as in claim 1, wherein the first glue is different from the one or more second glues.

4. The method as in claim 1, wherein the one or more second glues are dosed in strips of glue associated to the strengthening strips.

5. The method as in claim 1, wherein the method provides to dose a plurality of second glues of different types, in order to carry out different functions with respect to each other.

6. The method as in claim 1, wherein the method provides to dose a plurality of second glues with thicknesses different from each other.

7. The method as in claim 1, wherein the first glue is dosed and applied on the one or more honeycomb inserts.

8. The method as in claim 1, wherein a dosing and application of the first glue can be carried out alternatively:
    first on a lower face of the one or more honeycomb inserts, subsequently depositing and gluing the one or more honeycomb inserts on the first cover and then dosing and applying the first glue also on the upper face of the one or more honeycomb inserts,
    or, at the same time both on the lower face and also on the upper face of the one or more honeycomb inserts.

9. The method as in claim 1, wherein the first glue is dosed and applied on the one or more honeycomb inserts by spreading.

10. The method as in claim 9, wherein the spreading is carried out using rollers.

11. The method as in claim 1, wherein the composition and pressing of the first semi-worked piece and of the second semi-worked piece provides that the second semi-worked piece is upended and placed on the first semi-worked piece and subsequently that the composed first semi-worked piece and second semi-worked piece are subjected to a pressing operation.

* * * * *